US011878600B2

(12) United States Patent
Marcos Pastor et al.

(10) Patent No.: US 11,878,600 B2
(45) Date of Patent: Jan. 23, 2024

(54) VEHICLE ON-BOARD CHARGER WITH VARIABLE DC-LINK VOLTAGE

(71) Applicant: Lear Corporation, Southfield, MI (US)

(72) Inventors: Adria Marcos Pastor, Valls (ES); Victor Saborido Rodriguez, Valls (ES); Sergio Martinez Porras, Valls (ES); Joel Aaron Storr, Valls (ES); Josep Maria Bosque Moncusi, Valls (ES)

(73) Assignee: Lear Corporation, Southfield, MI (US)

( * ) Notice: Subject to any disclaimer, the term of this patent is extended or adjusted under 35 U.S.C. 154(b) by 64 days.

(21) Appl. No.: 17/219,313

(22) Filed: Mar. 31, 2021

(65) Prior Publication Data
US 2022/0314823 A1 Oct. 6, 2022

(51) Int. Cl.
*B60L 53/20* (2019.01)
*H02J 7/04* (2006.01)

(52) U.S. Cl.
CPC ............... *B60L 53/20* (2019.02); *H02J 7/04* (2013.01); *B60L 2210/10* (2013.01); *B60L 2210/30* (2013.01); *B60L 2240/547* (2013.01); *H02J 2207/20* (2020.01)

(58) Field of Classification Search
CPC ..................................................... B60L 53/20
See application file for complete search history.

(56) References Cited

U.S. PATENT DOCUMENTS

| | | | | |
|---|---|---|---|---|
| 6,246,596 | B1 * | 6/2001 | Yamazaki | H02M 1/36 323/901 |
| 7,960,855 | B2 * | 6/2011 | King | B60L 7/14 307/46 |
| 8,120,323 | B2 | 2/2012 | Lai et al. | |
| 10,012,703 | B2 * | 7/2018 | Gilbert | B60L 50/64 |
| 10,124,680 | B1 * | 11/2018 | Bartolome | B60L 58/15 |
| 10,351,004 | B1 | 7/2019 | Pastor et al. | |
| 10,454,381 | B2 * | 10/2019 | Li | H02J 7/04 |
| 2003/0210019 | A1 * | 11/2003 | Chan | H02M 3/3372 323/222 |
| 2010/0014323 | A1 * | 1/2010 | Sato | B60L 50/61 363/17 |
| 2015/0340882 | A1 * | 11/2015 | Göth | H02J 7/04 320/167 |
| 2016/0236579 | A1 * | 8/2016 | Yim | B60L 53/24 |
| 2016/0352277 | A1 * | 12/2016 | Sagawa | H02P 25/08 |
| 2017/0047773 | A1 * | 2/2017 | Li | H02J 5/00 |

(Continued)

FOREIGN PATENT DOCUMENTS

FR 3087596 A1 4/2020
WO 2020149944 A1 7/2020

*Primary Examiner* — Drew A Dunn
*Assistant Examiner* — Tynese V McDaniel
(74) *Attorney, Agent, or Firm* — BROOKS KUSHMAN P.C.

(57) ABSTRACT

An on-board charger is provided with a first stage for converting an alternating current (AC) voltage from an external power supply to a direct current (DC) voltage. A capacitor is coupled to the first stage to receive the DC voltage and to provide a DC-Link voltage. A second stage is coupled to the capacitor to boost the DC-Link voltage and to supply the boosted DC-Link voltage to charge a battery. A processor is programmed to adjust the DC-Link voltage between a first setpoint and a second setpoint based on a battery voltage value.

18 Claims, 3 Drawing Sheets

(56) References Cited

U.S. PATENT DOCUMENTS

| | | | |
|---|---|---|---|
| 2017/0117731 A1* | 4/2017 | Shimada | H02M 3/158 |
| 2017/0358987 A1* | 12/2017 | Oouchi | H02M 3/3353 |
| 2018/0166903 A1* | 6/2018 | Sato | H02J 7/02 |
| 2018/0175652 A1* | 6/2018 | Jang | H02M 7/217 |
| 2018/0370369 A1* | 12/2018 | Jang | B60L 53/64 |
| 2019/0199114 A1* | 6/2019 | Tseng | H02J 7/02 |
| 2019/0202300 A1* | 7/2019 | Pastor | H02J 7/04 |
| 2020/0039375 A1* | 2/2020 | Ammanamanchi Venkata | H02M 1/08 |
| 2020/0247250 A1* | 8/2020 | Gonzales Espin | H04B 5/0093 |
| 2021/0070185 A1* | 3/2021 | Liu | B60L 53/14 |
| 2022/0072963 A1* | 3/2022 | Minamii | H02J 7/00304 |
| 2022/0176838 A1* | 6/2022 | Saborido Rodriguez | B60L 53/20 |

* cited by examiner

VEHICLE ON-BOARD CHARGER WITH VARIABLE DC-LINK VOLTAGE

TECHNICAL FIELD

One or more embodiments relate to a vehicle on-board charger that includes a variable DC-Link voltage.

BACKGROUND

Electrified vehicles, including pure electric vehicles and hybrid electric vehicles, include a high-voltage battery pack that is used for propulsion or "traction" of the vehicle, and may be referred to as a traction battery. Such electrified vehicles include power electronics for converting power supplied to and from the traction battery. Many electrified vehicles are designed to connect or "plug-in" to an alternating current (AC) power supply of 85-265 Volts, depending on the standard voltage of the region. For example, in the United States, plug-in electrified vehicles are designed to receive 110 VAC or 220 VAC from the mains or AC grid. The power electronics of such plug-in electrified vehicles convert the AC voltage to direct current (DC) voltage, then adjust the DC voltage for charging the traction battery.

SUMMARY

In one embodiment, an on-board charger is provided with a first stage for converting an alternating current (AC) voltage from an external power supply to a direct current (DC) voltage. A capacitor is coupled to the first stage to receive the DC voltage and to provide a DC-Link voltage. A second stage is coupled to the capacitor to boost the DC-Link voltage, and to supply the boosted DC-Link voltage to charge a battery. A processor is programmed to adjust the DC-Link voltage between a first setpoint and a second setpoint based on a battery voltage value.

In another embodiment, an on-board charger is provided with a rectifier for converting an alternating current (AC) voltage from an external power supply to a direct current (DC) voltage. A power factor correction (PFC) circuit is coupled to the rectifier. A capacitor is coupled to the PFC circuit to provide a DC-Link voltage. A converter is coupled to the capacitor to adjust the DC-Link voltage and is adapted to couple to a battery. A processor is programmed to adjust the DC-Link voltage between a first setpoint and a second setpoint based on a battery voltage value.

In yet another embodiment, a method is provided for adjusting a direct current (DC)-Link voltage of an on-board charger. An alternating current (AC) voltage is converted to a direct current (DC) voltage. A DC-Link voltage is provided based on the DC voltage. The DC-Link voltage is boosted. The DC-Link voltage is adjusted between a first setpoint and a second setpoint based on a battery voltage value, wherein the DC-Link voltage increases linearly based on an increasing battery voltage value.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
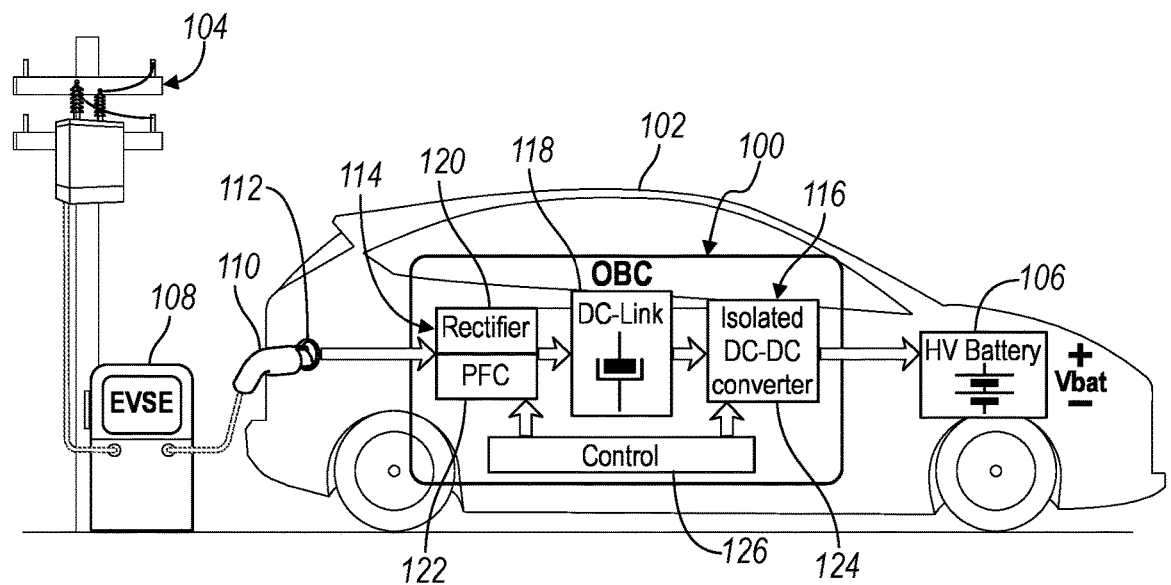
FIG. 1 is a schematic diagram of an electrified vehicle with an on-board charger, according to one or more embodiments.

With reference to FIG. 1, an on-board charger (OBC) is illustrated in accordance with one or more embodiments and generally referenced by numeral 100. The OBC 100 is depicted within a vehicle 102 and electrically connects an external power supply 104 to a traction battery 106 to facilitate charging. The OBC 100 conditions the power supplied from the external power supply 104, to provide the proper voltage and current levels to the traction battery 106.

The external power supply 104 is electrically coupled to electric vehicle supply equipment (EVSE) 108, e.g., a charger or a charging station. The external power supply 104 is an electrical power distribution network or AC grid as provided by an electric utility company and provides alternating current (AC) electric power to the EVSE 108. The EVSE 108 provides circuitry and controls to regulate and manage the transfer of energy between the external power supply 104 and the vehicle 102. The EVSE 108 includes a charge connector 110 for plugging into a charge port 112 of the vehicle 102. The charge port 112 may be any type of port to transfer power from the EVSE 108 to the OBC 100.

The OBC 100 converts the AC power received at the charge port 112 to a high-voltage (HV) direct current (DC) power output for charging the traction battery 106. The OBC 100 includes two cascaded power conversion stages 114, 116 that are separated from each other by a bulk capacitor 118. The first stage 114 includes a rectifier 120 to convert the AC power to DC power. The first stage 114 also includes a power factor correction (PFC) circuit 122 that is responsible for keeping a power factor (PF) close to unity. The bulk capacitor 118 decouples the AC electrical power to provide a stable DC-Link voltage. The DC-Link voltage refers to the voltage across the bulk capacitor 118. The second stage 116 includes a DC-DC converter 124 to adjust, e.g., step-up and step-down, the DC-Link voltage supplied to the traction battery 106.

The OBC 100 is designed to receive a wide range of AC voltages and to supply a wide range of DC voltages. The AC voltage supplied by the external power supply 104 may be between 85-265 volts AC (VAC) depending on the standard voltage of the region. For example, the AC grid in the United States supplies 120 VAC or 240 VAC, depending on the number of the phases; and the AC grid in Spain is 230 VAC. The voltage of the traction battery 106 may vary between 250-470 volts DC based on battery conditions, e.g., state-of-charge, age, ambient temperature, loading, etc. The OBC 100 also includes a controller 126 to control power electronics within the first stage 114 and the second stage 116 to adjust or convert the voltage of the input voltage to that of the output voltage. For example, the PFC circuit 122 includes switches that are controlled by the controller 126 to enable/disable different circuitry to adjust the DC-Link Voltage. Such conversion of electrical power results in inefficiencies or losses.

Figure 2:
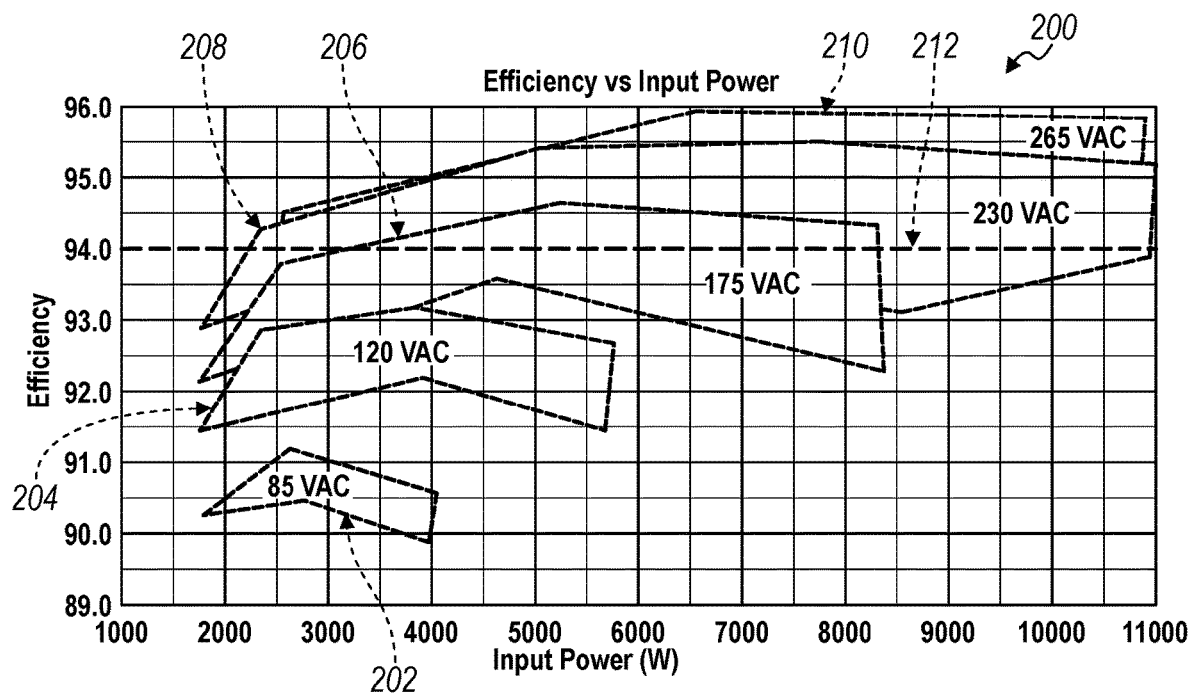
FIG. 2 is a graph illustrating the efficiency of the on-board charger at different input voltages.

FIG. 2 is a graph 200 that illustrates the impact of the input voltage value on the efficiency of the OBC 100. The graph 200 includes five regions that each correspond to a different input voltage including: a first region 202, corresponding to an input voltage of 85 VAC; a second region 204, corresponding to an input voltage of 120 VAC; a third region 206, corresponding to an input voltage of 175 VAC; a fourth region 208, corresponding to an input voltage of 230 VAC; and a fifth region 210, corresponding to an input voltage of 265 VAC. For each input voltage, the OBC 100 is controlled to provide a fixed DC-Link voltage at the bulk capacitor 118 of 400 V as the output voltage provided to the traction battery 106 varies within its operating range, i.e., between 250-470 volts DC.

Existing OBCs (not shown) are typically designed to accommodate the different AC grid voltages in the world. Such OBCs are typically designed to provide a fixed DC-Link voltage that is sized to accommodate the largest AC grid voltage. For example, the largest AC grid voltage in the world is equal to 265 VAC, which is a sinusoidal signal with root mean square (rms) value of 265 V, and a peak voltage of approximately 375 V. Existing OBCs typically select a fixed DC-Link voltage of approximately 400 V to accommodate a 265 VAC input, but such an approach is inefficient when the OBC is connected to a low-voltage AC grid.

As illustrated in the graph 200, the efficiency of the OBC 100 is less than 93% when it is connected to AC voltages that are less than 140 VAC, e.g., 85 VAC (region 1, 202) and 120 VAC (region 2, 204). Reference numeral 212 represents a target efficiency of 94%. The efficiency of the OBC 100 exceeds the target efficiency 212 when it is connected to AC voltages greater than 140 VAC, e.g., 175 VAC (region 3, 206), 230 VAC (region 4, 208), and 265 VAC (region 5, 210).

Figure 3:
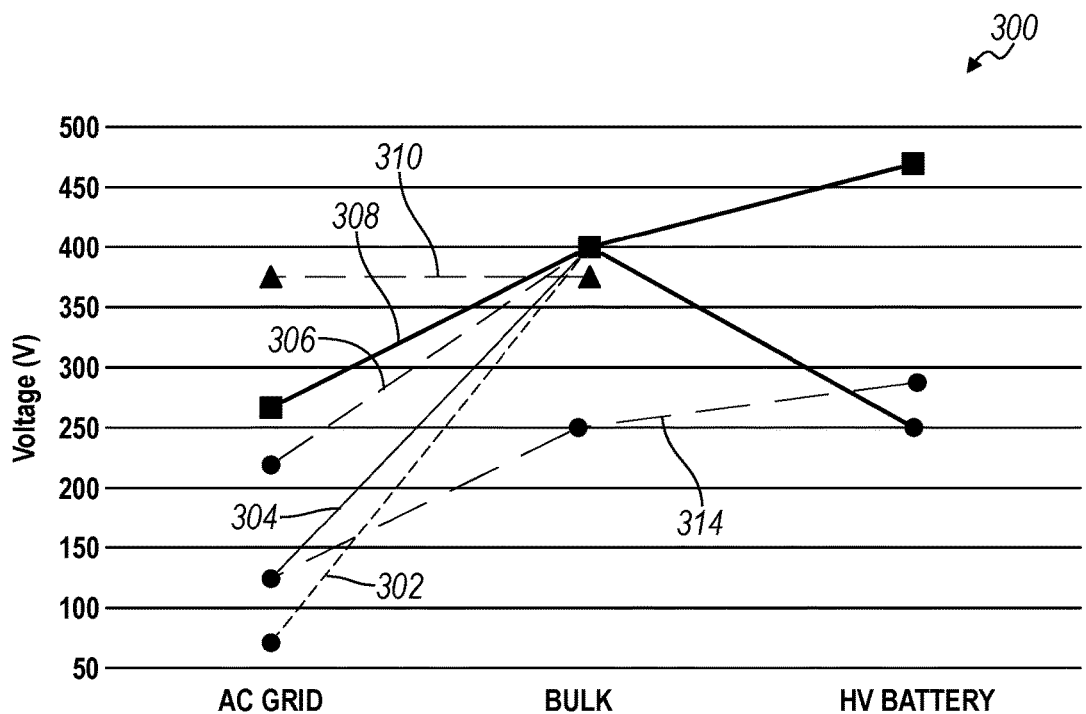
FIG. 3 is a graph illustrating voltage conversions between different stages of the on-board charger at different input voltages.

FIG. 3 is a graph 300 including four curves (302, 304, 306, and 308), illustrating the OBC 100 connected to four different AC input voltages. The first curve 302 illustrates the OBC 100 connected to an input voltage of 85 VAC, the second curve 304 illustrates the OBC 100 connected to an input voltage of 120 VAC, the third curve 306 illustrates the OBC 100 connected to an input voltage of 230 VAC, and the fourth curve 308 illustrates the OBC 100 connected to an input voltage of 265 VAC. Each curve 302, 304, 306, and 308 illustrates the OBC 100 boosting, or stepping-up, an input voltage from the AC grid to a DC-Link voltage of 400 volts, and then either boosting the voltage to a battery voltage of 470 volts; or bucking, stepping-down, the voltage to a battery voltage of 250 volts.

The fourth curve 308 illustrates the OBC 100 connected to 265 VAC, which is the root mean square (rms) value of the highest worldwide AC grid voltage. The peak value of 265 VACrms is approximately equal to 375 VACpk, which is represented by line 310. The first curve 302 and the second curve 304 illustrate the large voltage conversions between the AC grid voltage and the DC-Link voltage for low input voltage systems. Such large voltage conversions result in efficiency losses, which is shown by regions 202 (85 VAC) and 204 (120 VAC) in FIG. 2, which are both below the target efficiency line 212.

Figure 4:
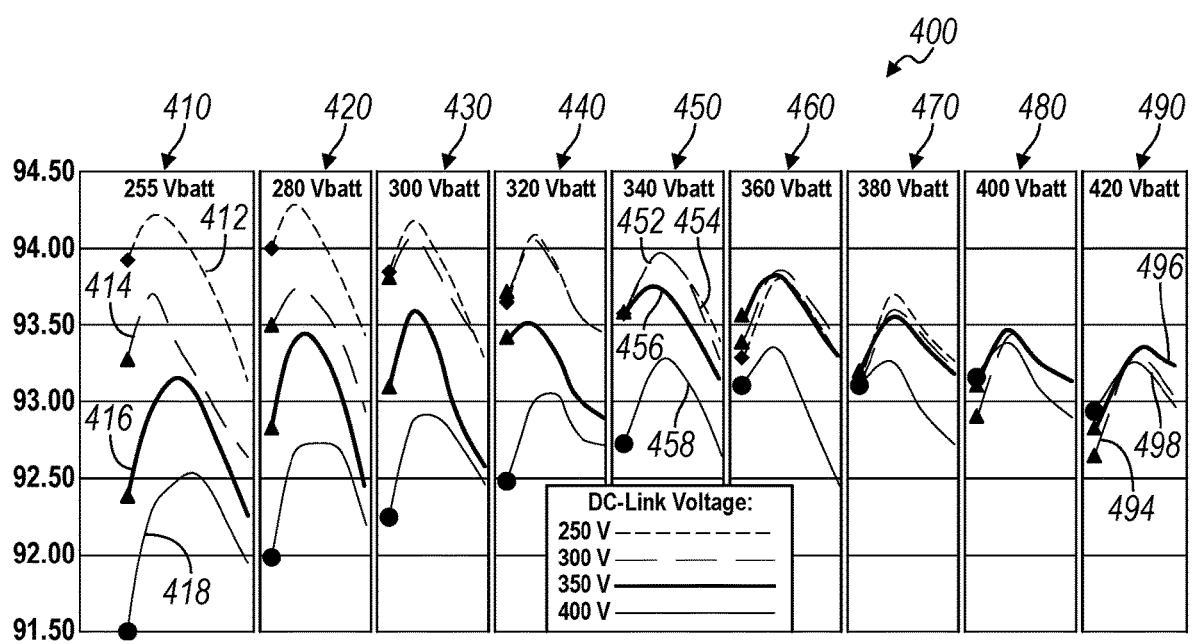
FIG. 4 is a graph illustrating the efficiency of the on-board charger at different DC-Link voltages and at different output voltages.

FIG. 4 is a graph 400 that illustrates the impact of different DC-Link voltages on the efficiency of the OBC 100 when connected to a low input voltage (120 VAC) and to batteries with different voltages. The graph 400 is separated into nine segments 410, 420, 430, 440, 450, 460, 470, 480, and 490 that correspond to traction battery voltages of 255 V, 280 V, 300 V, 320 V, 340 V, 360 V, 380 V, 400 V, and 420 V, respectively. Each graph segment includes four curves corresponding to DC-Link voltages of 250 V, 300 V, 350 V, and 400 V. For example, the graph 400 includes a first segment 410 in which the OBC 100 is: connected to an input voltage of 120 VAC; controlled to DC-Link voltages of: 250 volts (first curve 412), 300 volts (second curve 414), 350 volts (third curve 416), and 400 volts (fourth curve 418); and connected to a traction battery 106 with a voltage of 255 volts. The first graph segment 410 illustrates that at low battery voltages (e.g., 255 volts), the efficiency of the OBC 100 can be increased by approximately 2% by decreasing the DC-Link voltage from 400 volts (fourth curve 418) to 250 volts (first curve 412). This DC-Link voltage adjustment is illustrated by curves 304 and 314 in FIG. 3, both start at 120 VAC and end at approximately 250 V; but curve 314 includes less voltage adjustment, and corresponding efficiency losses, through the lower DC-Link voltage.

The graph 400 includes a fifth segment 450 in which the OBC 100 is controlled to DC-Link voltages of: 250 volts (first curve 452), 300 volts (second curve 454), 350 volts (third curve 456), and 400 volts (fourth curve 458); and is connected to a traction battery 106 with a voltage of 340 volts. The graph 400 also includes a ninth segment 490 in which the OBC 100 is controlled to DC-Link voltages of: 250 volts (first curve 492), 300 volts (second curve 494), 350 volts (third curve 496), and 400 volts (fourth curve 498); and connected to a traction battery 106 with a voltage of 420 volts. The curves in the fifth segment 450, where Vbat is equal to 340 V, are closer together than the curves in the first segment 410, where Vbat is equal to 255 V. Further, the curves in the ninth segment 490, where Vbat is equal to 420 V, are closer together than the curves in the fifth segment 450, where Vbat is equal to 340 V. The spacing between the curves in the first, fifth and ninth graph segments 410, 450, and 490 illustrate that as the battery voltage increases, the DC-Link voltage has less impact on efficiency.

Figure 5:
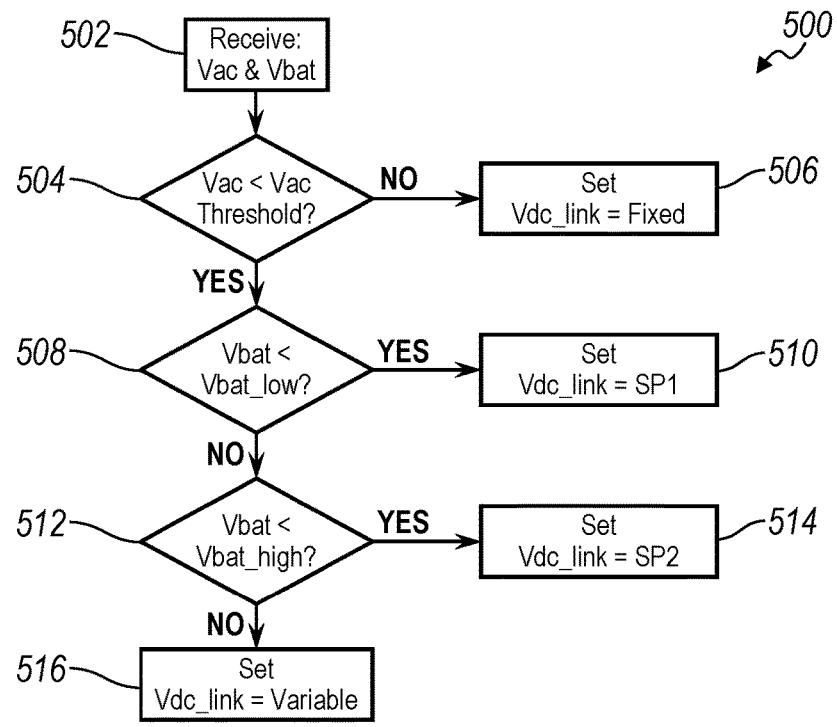
FIG. 5 is a flow chart illustrating a method for adjusting the DC-Link voltage.

With reference to FIG. 5, a method for adjusting a DC-Link Voltage of the OBC 100 is illustrated in accordance with one or more embodiments and generally referenced by numeral 500. The method 500 is implemented using software code contained within the controller 126 according to one or more embodiments. While the method is described using flowcharts that are illustrated with a number of sequential steps, one or more steps may be omitted and/or executed in another manner in one or more other embodiments. In other embodiments, the software code is distributed among multiple controllers, e.g., the controller 126 and one or more vehicle controllers; and/or stored remotely and accessed via the cloud.

Although the controller 126 is shown as a single controller, it may contain multiple controllers, or may be embodied as software code within one or more other controllers. The controller 126 generally includes any number of microprocessors, ASICs, ICs, memory (e.g., FLASH, ROM, RAM, EPROM and/or EEPROM) and software code to co-act with one another to perform a series of operations. Such hardware and/or software may be grouped together in assemblies to perform certain functions. Any one or more of the controllers or devices described herein include computer executable instructions that may be compiled or interpreted from computer programs created using a variety of programming languages and/or technologies. In general, a processor (such as a microprocessor) receives instructions, for example from a memory, a computer-readable medium, or the like, and executes the instructions. A processing unit includes a non-transitory computer-readable storage medium capable of executing instructions of a software program. The computer readable storage medium may be, but is not limited to, an electronic storage device, a magnetic storage device, an optical storage device, an electromagnetic storage device, a semi-conductor storage device, or any suitable combination thereof. The controller 126, also includes predetermined data, or "look up tables" that are stored within memory, according to one or more embodiments.

At step 502, the controller 126 receives input indicative of the input voltage value (Vac) and the battery voltage value (Vbat). The Vac is the rms value of the AC input voltage, which is a fixed value, e.g., 120 VAC or 240 VAC, and may be provided by the EVSE 108. The Vbat is the DC voltage of the traction battery 106, which varies within a voltage range, e.g., 250-470 V, and may be provided by a separate vehicle controller, e.g., a battery controller over a vehicle bus (not shown).

At step 504, the controller 126 compares the Vac value to a Vac threshold value. The Vac threshold value is indicative of an input voltage value below which it is inefficient to charge using a fixed high-voltage DC-Link voltage value. In one embodiment, the Vac threshold value is equal to 140 VAC. If the controller 126 determines that the Vac value is greater than or equal to the Vac threshold value, it proceeds to step 506 and sets the Vdc_link equal to a fixed voltage. In one embodiment, the fixed voltage is approximately equal to 400 V. As described above with reference to FIG. 2, a fixed DC-Link voltage is efficient for an OBC connected to a high-input voltage, e.g., over 140 VAC. If the controller 126 determines that that the OBC 100 is connected to a low AC input voltage, i.e., Vac is less than the Vac threshold value, then it proceeds to steps 508-516 and adjusts the DC-Link voltage based on the battery voltage.

Figure 6:
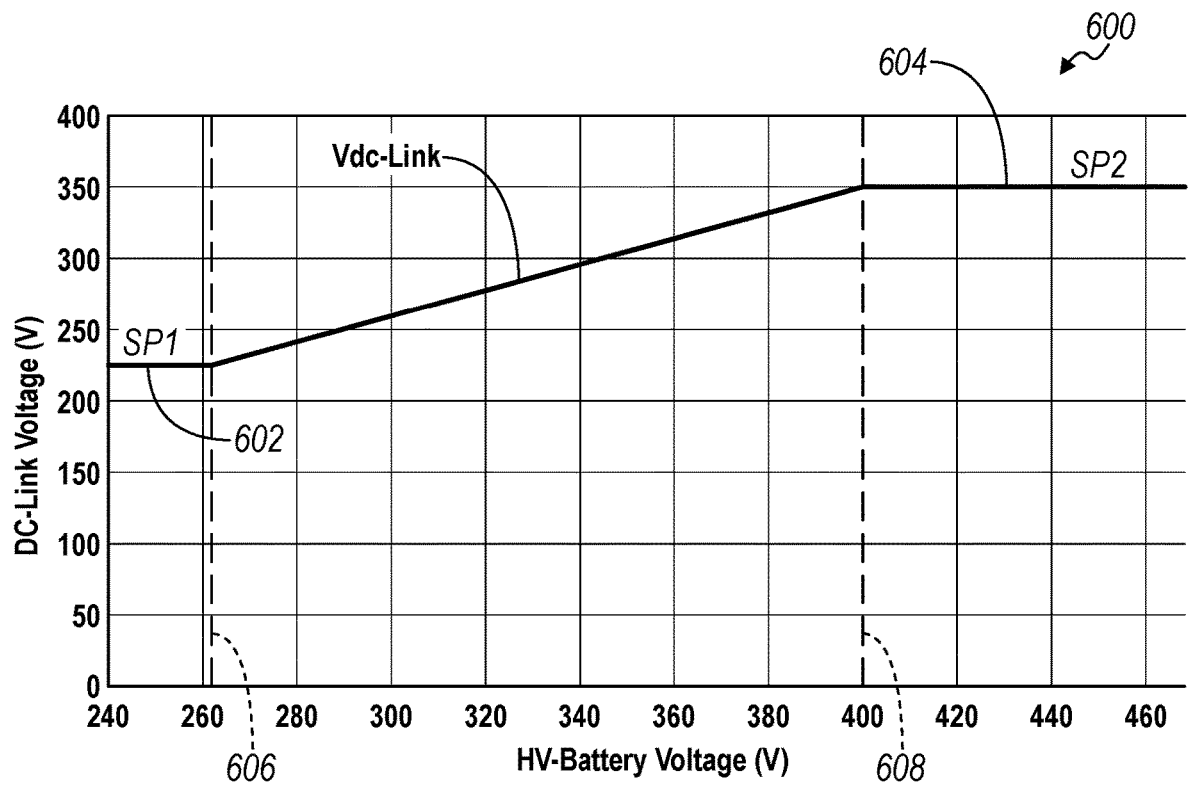
FIG. 6 is graph illustrating adjusting a DC-Link voltage as a function of battery voltage according to the method of FIG. 5.

FIG. 6 is a graph 600 illustrating a DC-Link voltage that is adjusted, by the controller 126, based on battery voltage. The controller 126 adjusts the DC-Link voltage linearly between a low-saturation voltage 602 and a high-saturation voltage 604. The low-saturation voltage 602 refers to a minimum DC-Link voltage that is larger than the peak voltage of the input voltage value (Vac). For example, the peak voltage value of a 140 VAC (rms) signal is approximately equal to 198 Volts, and the illustrated embodiment depicts a low-saturation voltage 602 that is approximately equal to 225 V. In other embodiments, the low-saturation voltage 602 is between approximately 200-250 V. The high-saturation voltage refers to a maximum DC-Link voltage, above which there is minimal efficiency improvement. As shown in FIG. 4, a DC-Link voltage of 400 V is less efficient than a DC-Link voltage of 350 V throughout the battery operating range; therefore the illustrated embodiment depicts a high-saturation voltage 604 that is approximately equal to 350 V.

With reference to FIGS. 5 and 6, the controller 126 compares the battery voltage value (Vbat) to a low-voltage threshold value (Vbat_low) at step 508. Vbat_low corresponds to a voltage value in a lower portion of the traction battery's operating range. In one embodiment the operating range of the traction battery 106 is equal to 250-470 V, and Vbat_low is equal to approximately 260 V, which is referenced by a dashed line 606 in FIG. 6. In another embodiment, the operating range of the traction battery 106 is equal to 240-480 V. If the controller 126 determines that the battery voltage is less than the low-voltage threshold value, i.e., (Vbat<Vbat_low), the controller 126 proceeds to step 510 and sets the DC-Link voltage (Vdc_link) equal to a first setpoint (SP1) voltage. SP1 refers to the low-saturation voltage 602 (FIG. 6) and is set to a voltage value that is larger than the peak voltage of the AC input voltage. In one embodiment, SP1 is equal to a voltage value between 200-250 V. In another embodiment, SP1 is equal to approximately 225 V.

At step 512, the controller 126 compares the battery voltage value (Vbat) to a high-voltage threshold value (Vbat_high). Vbat_high corresponds to a voltage value in an intermediate portion of the traction battery's operating voltage range above which there is minimal efficiency improvement by adjusting the DC-Link voltage. For example, as shown in graph segments 480 and 490 in FIG. 4, there is minimal separation between the DC-Link curves above a battery voltage of approximately 400 V. In one embodiment the operating range of the traction battery 106 is equal to 250-470 V, and Vbat_high is equal to approximately 400 V, which is reference by a dashed line 608 in FIG. 6. If the controller 126 determines that the battery voltage is greater than the high-voltage threshold value, i.e., (Vbat>Vbat_high), the controller 126 proceeds to step 514 and sets the DC-Link voltage (Vdc_link) equal to a second setpoint (SP2). SP2 refers to the high-saturation voltage 604 and is set to a DC-Link voltage value above which there is minimal efficiency improvement. In one embodiment, SP2 is equal to approximately 350 V.

As shown in FIG. 4, the efficiency of the OBC 100 increases by increasing the DC-Link voltage between the low battery saturation voltage and the high battery saturation voltage. If Vbat is between Vbat_low and Vbat_high, the controller 126 proceeds to step 516 and adjusts Vdc_link based on the battery voltage (Vbat). In one or more embodiments, the controller 126 adjusts Vdc_link so that it increases progressively based on Vbat, e.g., based on a linear, stepped, quadratic, or exponential relationship. In one embodiment, the controller 126 adjusts Vdc_link so that it increases linearly based on Vbat, the first setpoint (SP1), the second setpoint (SP2), the low-voltage threshold value (Vbat_low), and the high-voltage threshold value (Vbat_high) according to equation 1:

$$\text{Vdc\_link} = \frac{(SP2 - SP1)}{(\text{Vbat\_high} - \text{Vbat\_low})} * Vbat - b \quad (1)$$

Equation 1 is based on the slope-intercept equation for a straight line, where the variable (b) represents the y-axis intercept. Equation 1 can be rewritten to solve for b using known values for the other variables. For example, with reference to the FIG. 6, in one embodiment SP1 is equal to 225 V, SP2 is equal to 350 V, Vbat_high is equal to 400 V, and Vbat low is equal to 260 V, and equation 1 may be solved for b, which is equal to −10. Then equation 1 may be simplified as shown in equation 2:

$$\text{Vdc\_link} = 0.9 * \text{Vbat} - 10 \quad (2)$$

The OBC 100 adjusts the DC-Link voltage for low-voltage charging, i.e., when connected to low-voltage AC grid voltage, which minimizes unnecessary voltage conversion and maximizes efficiency. The OBC 100 increases the DC-Link voltage linearly with increasing battery voltage between a first setpoint and a second setpoint that is less than the battery voltage. This approach avoids unnecessary voltage conversion strategies of existing OBCs that step-up an input voltage to a high DC-Link voltage and then step-down the high DC-Link voltage to a low battery voltage. The OBC 100 recognizes the input voltage value and sets the DC-Link voltage value to a fixed voltage when it is connected to a high-voltage AC grid, which allows for a worldwide system. This approach also accommodates regions that use different AC grid voltages, such as the United States, where the OBC 100 can be connected to 120 VAC or 240 VAC.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An on-board charger comprising:
   a first stage for converting an alternating current (AC) voltage from an external power supply to a direct current (DC) voltage;
   a capacitor coupled to the first stage to receive the DC voltage and to provide a DC-Link voltage;
   a second stage coupled to the capacitor to boost the DC-Link voltage and to supply the boosted DC-Link voltage to charge a battery; and
   a processor programmed to:
      set the DC-Link voltage to a constant voltage value in response to the AC voltage from the external power supply exceeding a threshold value, wherein the threshold value is equal to 140 Volts AC; and
      adjust the DC-Link voltage between a first setpoint and a second setpoint based on a battery voltage value, in response to the AC voltage being less than the threshold value.

2. The on-board charger of claim 1, wherein the processor is further programmed to progressively increase the DC-Link voltage between the first setpoint and the second setpoint based on an increasing battery voltage value.

3. The on-board charger of claim 1, wherein the processor is further programmed to linearly increase the DC-Link voltage between the first setpoint and the second setpoint based on an increasing battery voltage value.

4. The on-board charger of claim 1, wherein the first setpoint is greater than a peak value of the AC voltage from the external power supply.

5. The on-board charger of claim 1, wherein the processor is further programmed to set the DC-Link voltage to the first setpoint in response to the battery voltage value being less than a low-voltage threshold value.

6. The on-board charger of claim 1, wherein the second setpoint is indicative of a DC-Link voltage value that is less than the battery voltage value.

7. The on-board charger of claim 1, wherein the processor is further programmed to set the DC-Link voltage to the second setpoint in response to the battery voltage value exceeding a high-voltage threshold value.

8. The on-board charger of claim 1, wherein the first stage comprises:
   a rectifier for converting the AC voltage to the DC voltage; and
   a power factor correction (PFC) circuit coupled between the rectifier and the capacitor to adjust the DC-Link voltage.

9. The on-board charger of claim 1, wherein the second stage comprises a DC-DC converter coupled to the capacitor to boost the DC-Link voltage.

10. The on-board charger of claim 1, wherein the constant voltage value is approximately equal to approximately equal to 400 Volts DC.

11. An on-board charger comprising:
    a rectifier for converting an alternating current (AC) voltage from an external power supply to a direct current (DC) voltage;
    a power factor correction (PFC) circuit coupled to the rectifier;
    a capacitor coupled to the PFC circuit to provide a DC-Link voltage;
    a converter coupled to the capacitor to adjust the DC-Link voltage and adapted to couple to a battery; and
    a processor programmed to:
       adjust the DC-Link voltage between a first setpoint and a second setpoint based on a battery voltage value, in response to the AC voltage being less than a threshold value, wherein the threshold value is equal to 140 Volts AC; and
       set the DC-Link voltage to a constant voltage value in response to the AC voltage from the external power supply exceeding the threshold value.

12. The on-board charger of claim 11, wherein the processor is further programmed to progressively increase the DC-Link voltage between the first setpoint and the second setpoint based on an increasing battery voltage value.

13. The on-board charger of claim 11, wherein the processor is further programmed to linearly increase the DC-Link voltage between the first setpoint and the second setpoint based on an increasing battery voltage value.

14. The on-board charger of claim 11, wherein the processor is further programmed to set the DC-Link voltage to the first setpoint in response to the battery voltage value being less than a low-voltage threshold value, wherein the first setpoint is greater than a peak value of the AC voltage.

15. The on-board charger of claim 11, wherein the processor is further programmed to set the DC-Link voltage to the second setpoint in response to the battery voltage value being greater than a high-voltage threshold value, wherein the second setpoint is indicative of a DC-Link voltage value that is less than the battery voltage value.

16. A method for adjusting a direct current (DC)-Link voltage of an on-board charger, the method comprising:
    converting an alternating current (AC) voltage to a direct current (DC) voltage;
    providing a DC-Link voltage based on the DC voltage;
    boosting the DC-Link voltage;
    setting the DC-Link voltage to a constant voltage value in response to the AC voltage exceeding a threshold value, wherein the threshold value is equal to 140 Volts AC; and
    adjusting the DC-Link voltage between a first setpoint and a second setpoint based on a battery voltage value, wherein the DC-Link voltage increases progressively based on an increasing battery voltage value.

17. The method of claim 16, wherein the DC-Link voltage increases linearly based on the increasing battery voltage value.

18. The method of claim 16 further comprising:
    setting the DC-Link voltage to the first setpoint in response to the battery voltage value being less than a low-voltage threshold value; and setting the DC-Link voltage to the second setpoint in response to the battery voltage value exceeding a high-voltage threshold value.

\* \* \* \* \*